United States Patent
Chao et al.

(10) Patent No.: US 7,789,548 B2
(45) Date of Patent: *Sep. 7, 2010

(54) OPTICAL DIFFUSION MODULE HAVING CONVEX AND CONCAVE PORTIONS ARRANGED IN A TWO DIMENSIONAL ARRAY

(75) Inventors: Chih-Chiang Chao, Taipei (TW);
Po-Ling Shiao, Hsinchu (TW); Yu-Tsan Tseng, Taoyuan County (TW);
Cheng-Hsuan Lin, Changhua County (TW); Mei Chun Lai, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 252 days.

This patent is subject to a terminal disclaimer.

(21) Appl. No.: 11/672,869

(22) Filed: Feb. 8, 2007

(65) Prior Publication Data

US 2008/0055932 A1 Mar. 6, 2008

(30) Foreign Application Priority Data

Aug. 30, 2006 (TW) .............................. 95132005 A

(51) Int. Cl.
*F21V 7/04* (2006.01)
(52) U.S. Cl. ...................... 362/619; 362/617; 362/620; 362/339
(58) Field of Classification Search ......... 362/617–620, 362/338–340, 26, 29, 30, 330, 332, 333, 362/606, 607, 627, 628, 558, 97.1–97.4, 362/561; 385/129, 146, 147; 359/831, 837, 359/707, 599; 349/64, 112
See application file for complete search history.

(56) References Cited

U.S. PATENT DOCUMENTS

| | | | | |
|---|---|---|---|---|
| 6,163,405 A * | 12/2000 | Chang et al. | ................. | 359/599 |
| 6,250,777 B1 * | 6/2001 | Aoyama | ..................... | 362/326 |
| 6,445,504 B1 * | 9/2002 | Suga et al. | .................. | 359/599 |
| 6,913,365 B2 * | 7/2005 | Masaki et al. | ............... | 362/627 |
| 2003/0058553 A1 * | 3/2003 | Epstein et al. | ............. | 359/831 |
| 2004/0061944 A1 * | 4/2004 | Kashima et al. | ............. | 359/599 |
| 2005/0007793 A1 * | 1/2005 | Yoshida et al. | ............. | 362/558 |
| 2006/0250707 A1 * | 11/2006 | Whitney et al. | ............. | 359/831 |
| 2006/0256582 A1 * | 11/2006 | Chuang | ..................... | 362/620 |
| 2008/0304164 A1 * | 12/2008 | Chao et al. | .................. | 359/707 |

FOREIGN PATENT DOCUMENTS

JP 2004126016 A * 4/2004

OTHER PUBLICATIONS

English Abstract of Japanese Publication JP 2004126016 A.*

* cited by examiner

*Primary Examiner*—Jong-Suk (James) Lee
*Assistant Examiner*—Kevin J. Spinella

(57) ABSTRACT

An optical diffusion structure includes an optical diffusion structure comprising a plurality of convex portions and a plurality of concave portions. Each convex portion is adjacent to a plurality of concave portions and each concave portion is adjacent to a plurality of convex portions. The convex portions, the concave portions and each junction of the convex and concave portions have a curvature different from 0. The optical diffusion structure further includes a diffusion plate having a first surface, wherein the optical diffusion structure is formed on the first surface, and the convex portions are arranged in a two dimensional array along a first direction and a second direction, and the concave portions are arranged in a two dimensional array along a third direction and a fourth direction.

30 Claims, 12 Drawing Sheets

OPTICAL DIFFUSION MODULE HAVING CONVEX AND CONCAVE PORTIONS ARRANGED IN A TWO DIMENSIONAL ARRAY

BACKGROUND OF THE INVENTION

1. Field of the Invention

The invention relates to optical diffusion, and in particular to an optical diffusion structure with an array of convex portions and concave portions alternatingly arranged.

2. Description of the Related Art

Light emitting diodes, rather than CCFLs, are applied in backlight modules due to low cost and simplified structure. To keep the light source uniform, an optical diffusion structure is used. For point light source or linear light sources, the diffusion structure is usually designed to diffuse light in one or two dimensions.

A conventional backlight module employs a diffusion plate which has a blurred structure, a grained structure or micro-lens array. The blurred structure causes intensity reduction. The grained structure has small diffusion angle and cannot easily control diffusion directions. The micro-lens array operates at high intensity and is able to control the diffusion direction. The methods of manufacturing micro-lens array comprise mechanical methods, thermal fusion methods, or other complex methods, wherein a laser dragging method is generally used.

A laser dragging method is shown in FIG. 1a. A laser beam B passes through a mask 5 and reaches a substrate 10. When the mask 5 moves in a direction L7, the laser beam etches the substrate 10 to form grooves 12 which constitute a micro-lens array. A sharp corner with curvature equal to zero is formed between two grooves 12. The factors for controlling laser dragging comprise dragging speed, laser power, and number of repeated operations, which affect the depth of the grooves 12. The profile of the micro-lens array, however, depends on the pattern of the mask. Referring to FIG. 1b, a pattern M3 with large openings and small openings is formed on a mask M30. The mask M30 is applied to the laser dragging method to form a plurality of first micro-lenses 202 (concave portions) and a second micro-lens (convex portions) 204 arranged alternatingly. The area of the openings determines the etching depth. An ellipse array pattern or circle array pattern can be applied.

FIG. 2a depicts an optical diffusion structure 200 manufactured by the mask M3 in FIG. 1b along with a diffusion plate 50. FIG. 2b depicts the intensity of light passing through the optical diffusion structure 200. The stripes in FIG. 2b represent the area where light is condensed. Number 30 represents LED array. FIG. 2c depicts a blurred structure 210 formed on the back of the optical diffusion structure 200 for enhanced light diffusion.

BRIEF SUMMARY OF INVENTION

An optical diffusion structure of the invention comprises a plurality of convex portions and a plurality of concave portions. Each convex portion is adjacent to a plurality of concave portions and each concave portion is adjacent to a plurality of convex portions. The convex portions, the concave portions and each junction of the convex and concave portions have a curvature other than 0.

An embodiment of the optical diffusion structure of the invention comprises a diffusion plate having a first surface, wherein the optical diffusion structure is formed on the first surface. The convex portions are arranged in a two dimensional array along a first direction and a second direction, and the concave portions are arranged in a two dimensional array along a third direction and a fourth direction.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 2b is an intensity diagram of the optical diffusion structure of FIG. 2a;

DETAILED DESCRIPTION OF INVENTION

The invention discloses a two-dimensional optical diffusion structure for two-dimensional light diffusion. The optical diffusion structure of the invention is formed by a laser dragging method.

Figure 1A:
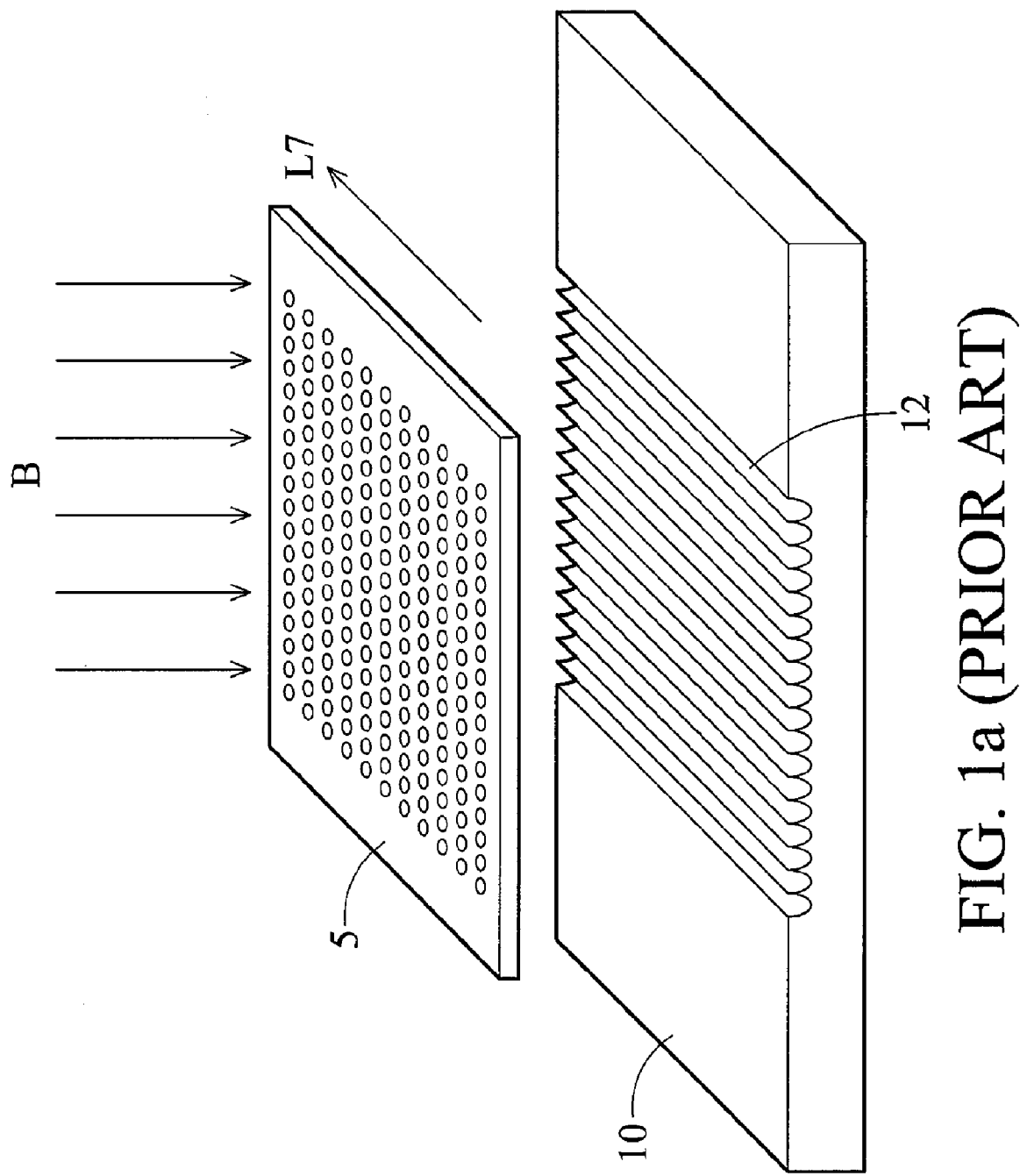
FIG. 1a is a schematic view of an optical diffusion structure manufactured by laser dragging.
Figure 1B:
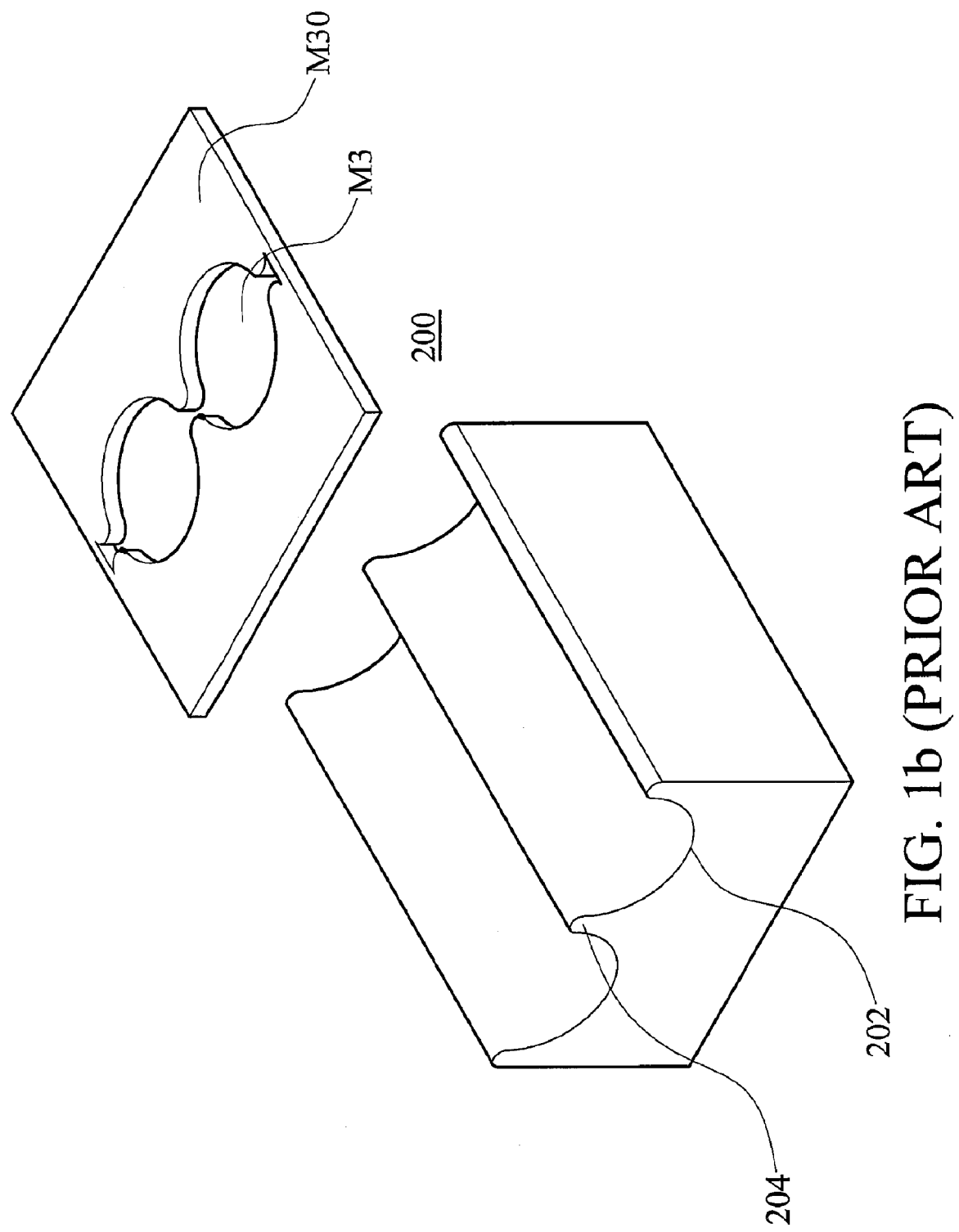
FIG. 1b depicts a mask used in the laser dragging method and an optical diffusion structure manufactured by the mask.
Figure 2A:
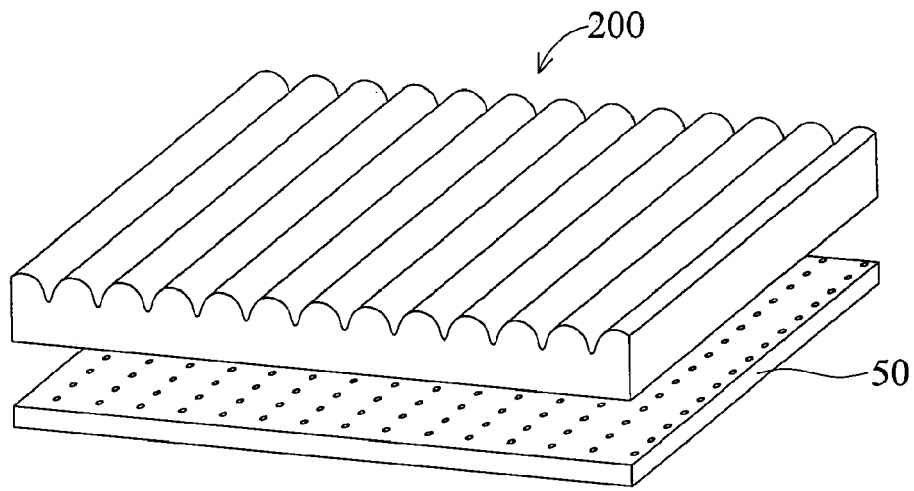
FIG. 2a depicts an application of the optical diffusion structure of FIG. 1b.
Figure 2B:
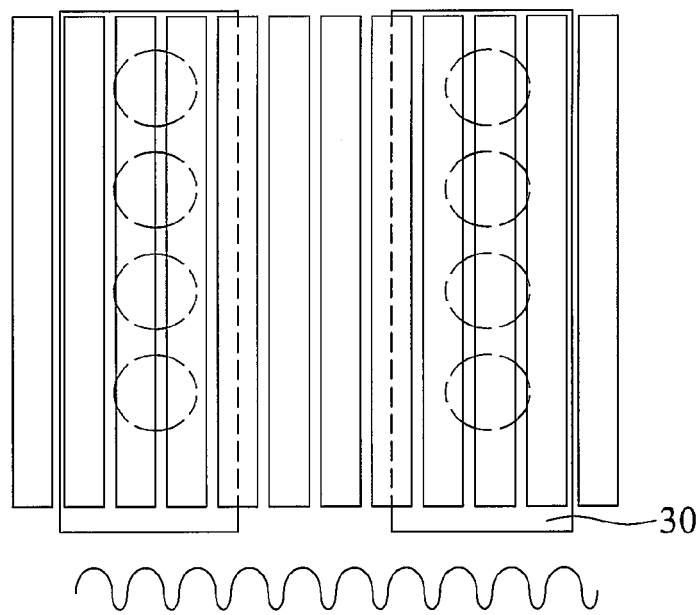
Figure 2C:
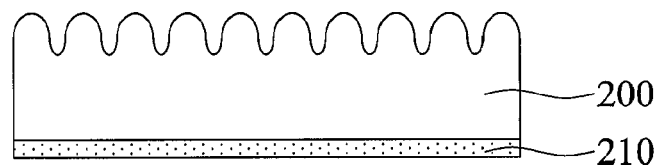
FIG. 2c depicts a blurred structure formed on the back of the optical diffusion structure.
Figure 3:
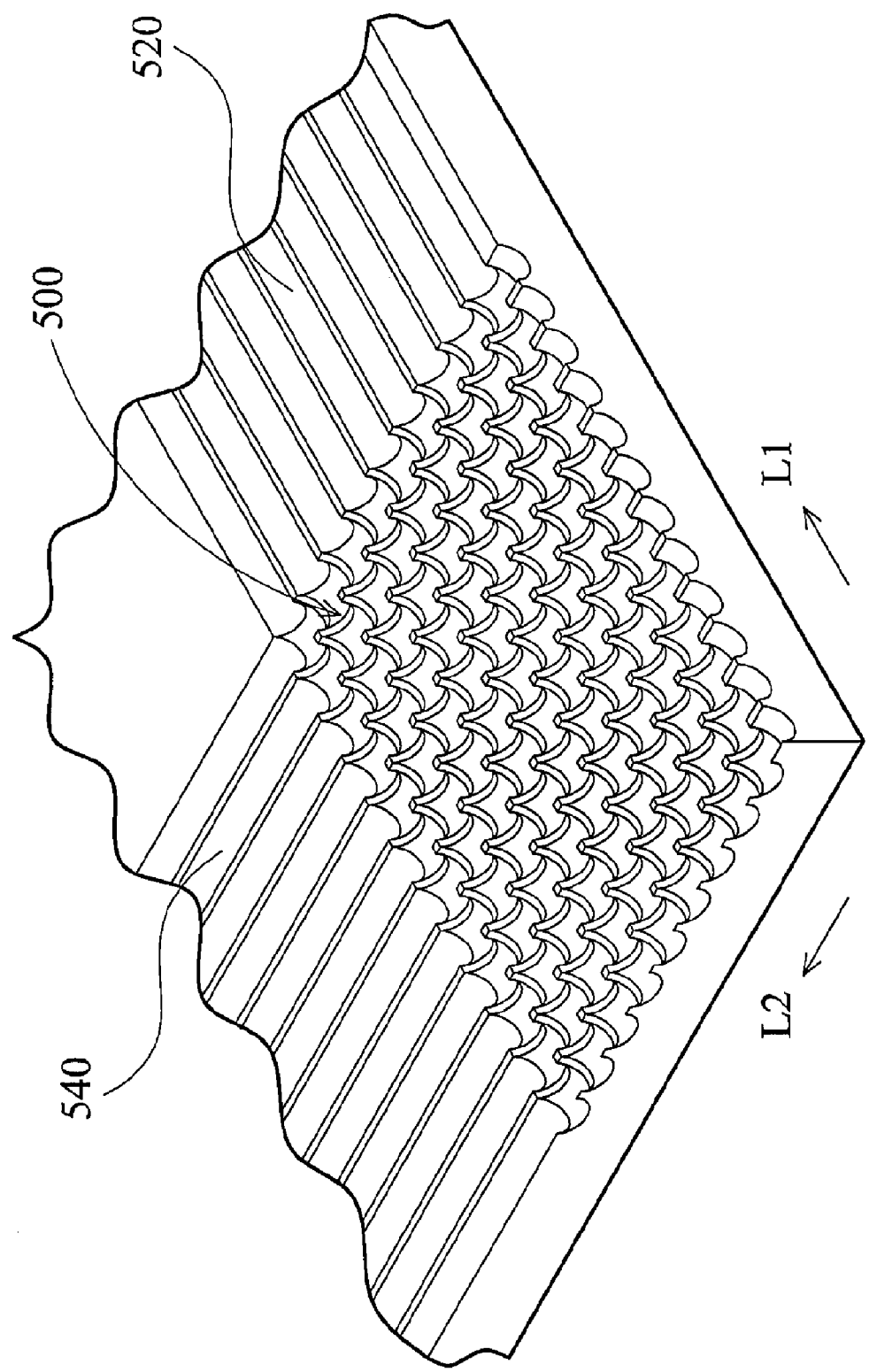
FIG. 3 is a schematic view of a method of forming an optical diffusion structure of the invention.

Referring to FIG. 3, a mask (not shown) is moved along a first direction L1, and laser beams passes through the mask to form a plurality of first grooves 520 on a substrate S. The mask is moved along a second direction L2 with laser beams passing therethrough to form a plurality of second grooves 540 on the substrate S. The first grooves 520 and the second grooves 540 constitute an optical diffusion structure 500 similar to stationary waves.

Figure 4:
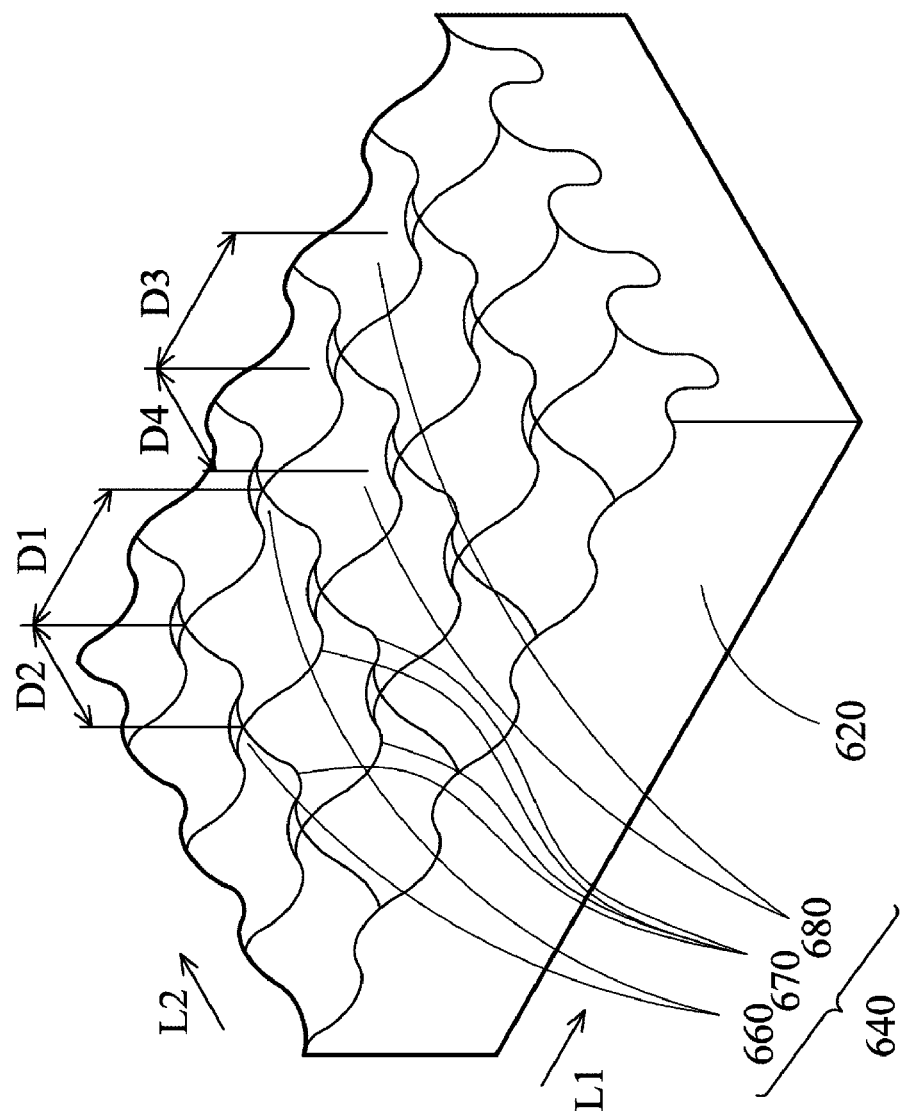
FIG. 4 depicts an optical diffusion structure manufactured by the method of FIG. 3.

FIG. 4 depicts an optical diffusion module 600 formed by laser dragging shown in FIG. 3. The optical diffusion structure 600 comprises a diffusion plate 620 and an optical diffusion structure 640 formed on the diffusion plate 620. The optical diffusion structure 640 comprises a plurality of convex portions 660, a plurality of concave portions 680, and a plurality of saddle portions 670. The convex portions 660 are arranged in a two-dimensional array along the first and second directions. Similarly, the concave portions 680 are arranged in a two-dimensional array along the first and second directions. The convex portions 660 and the concave portions 690 are arranged alternatingly to form a pattern similar to stationary waves. In this embodiment, each convex portion 660 is adjacent to four concave portions 680 and sandwiched by saddle portions 670 in both the first and second directions, and each concave portion 680 is also adjacent to four convex portions 660 and sandwiched by saddle portions 670 in both the first and second directions. The mask is designed in such a manner that curvatures at the convex portions 660, the concave portions 680 and each junction of the convex portion 660 and concave portion 680 are different from 0. Along the first direction L1, the distance between two adjacent convex portions 660 is D1, and the distance between two adjacent concave portions 680 is D3. Along the second direction L2, the distance between two adjacent convex portions 660 is D2, and the distance between two adjacent concave portions 680 is D4.

Although D1 is equal to D2, and D3 is equal to D4 in FIG. 4, D1, D2, D3 and D4 may different. Other embodiments are described by intensity diagrams as follows.

Figure 5:
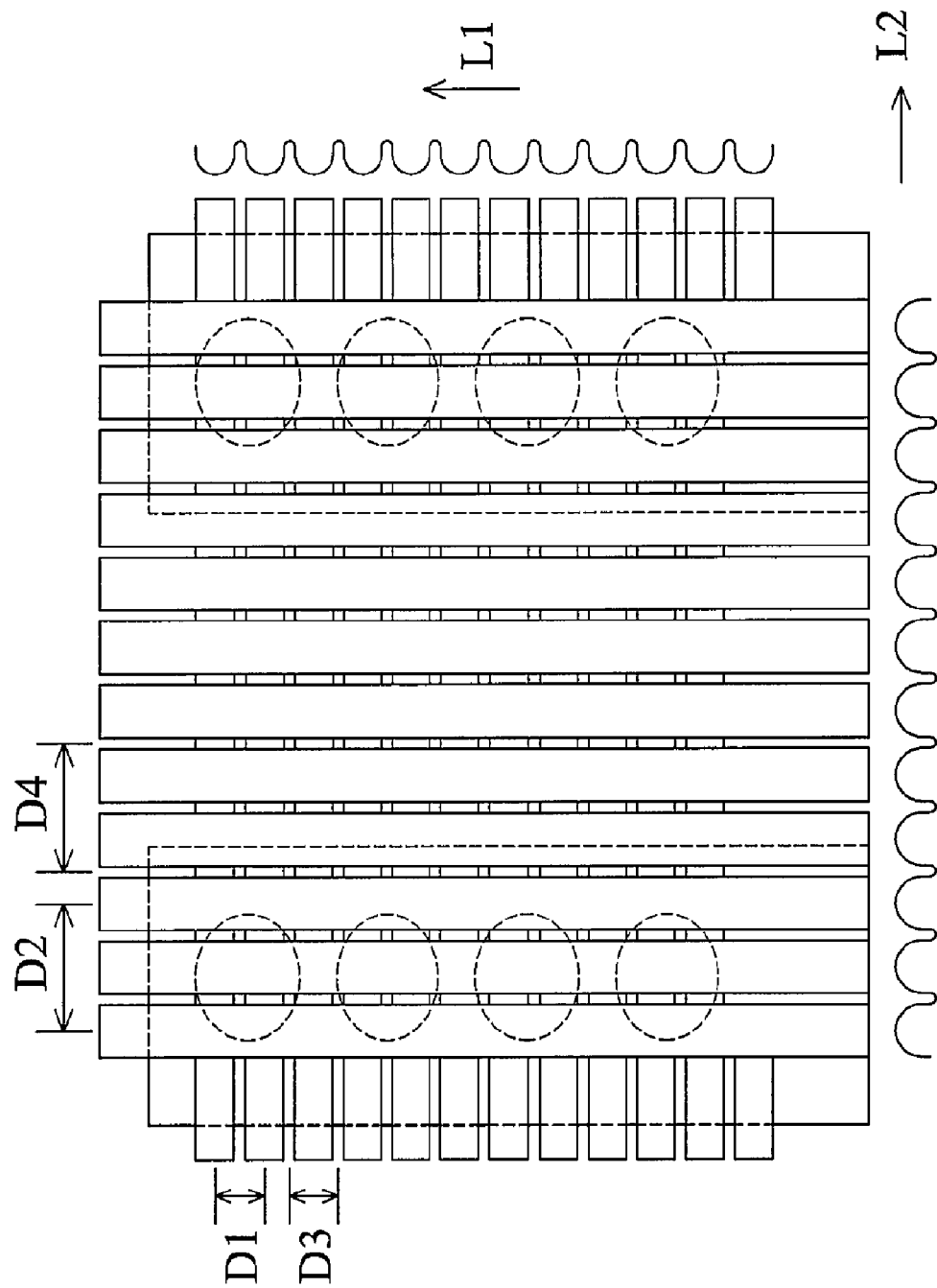
FIG. 5 is an intensity diagram of an embodiment of the optical diffusion structure of the invention.

FIG. 5 is an intensity diagram for another embodiment of the optical diffusion structure of the invention. The stripes in FIG. 5 represent bright regions where light is condensed. Distances D1 between any two adjacent convex portions 660 along the first direction L1 are the same. Distances D3 between any two adjacent concave portions 680 along the first direction L1 are the same. Distances D2 between any two adjacent convex portions 660 along the second direction L2 are the same. Distances D4 between any two adjacent concave portions 680 along the second direction L2 are the same.

Figure 6:
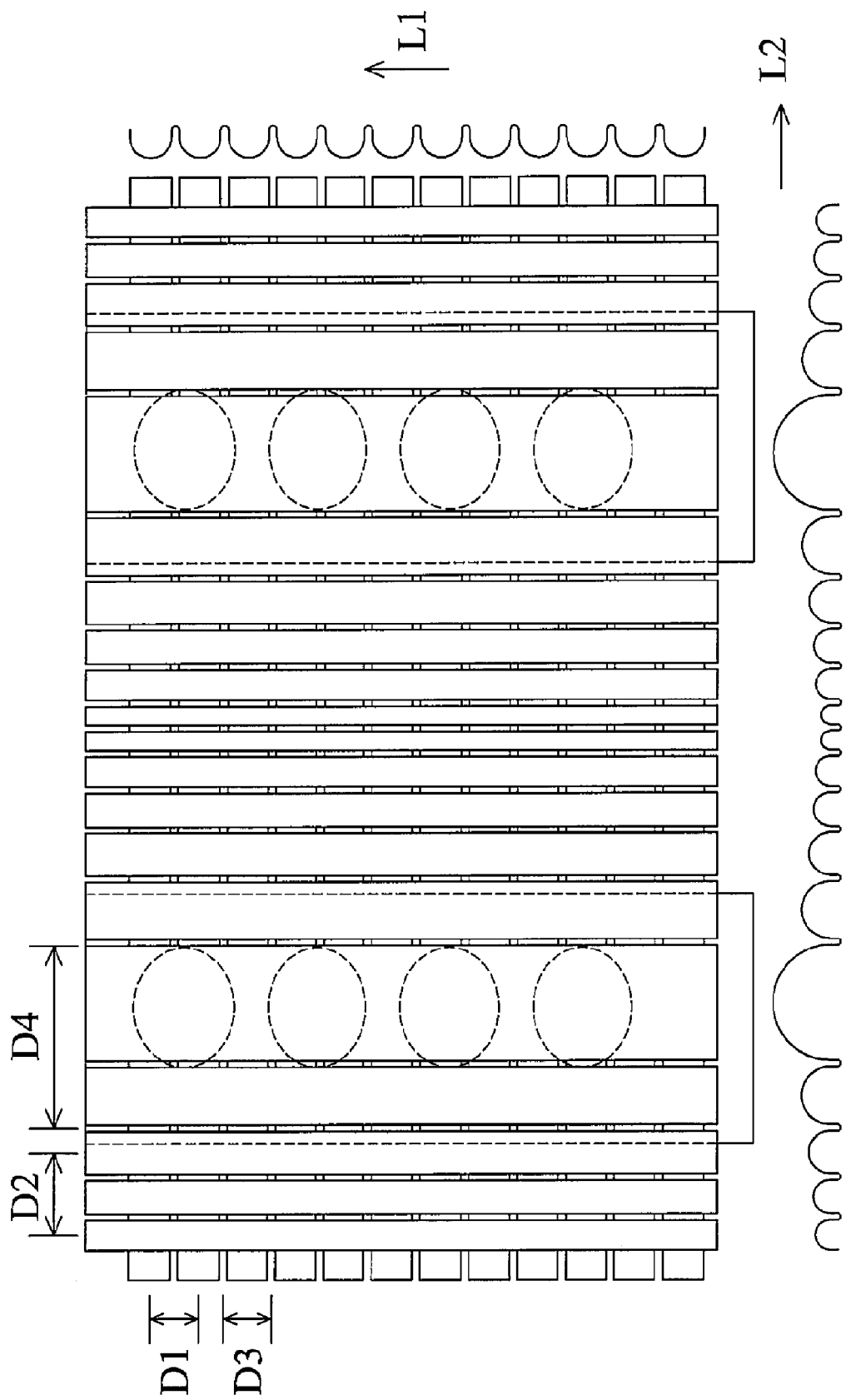
FIG. 6 is an intensity diagram of another embodiment of the optical diffusion structure of the invention.

FIG. 6 is an intensity diagram for another embodiment of the optical diffusion structure of the invention. Distances D1 between any two adjacent convex portions 660 along the first direction L1 are the same. Distances D3 between any two adjacent concave portions 680 along the first direction L1 are the same. Distances D2 between any two adjacent convex portions 660 along the second direction L2 are different. Distances D4 between any two adjacent concave portions 680 along the second direction L2 are different. D2 and D4 increase gradually from a center of the optical diffusion structure 640 to lateral sides thereof.

Figure 7:
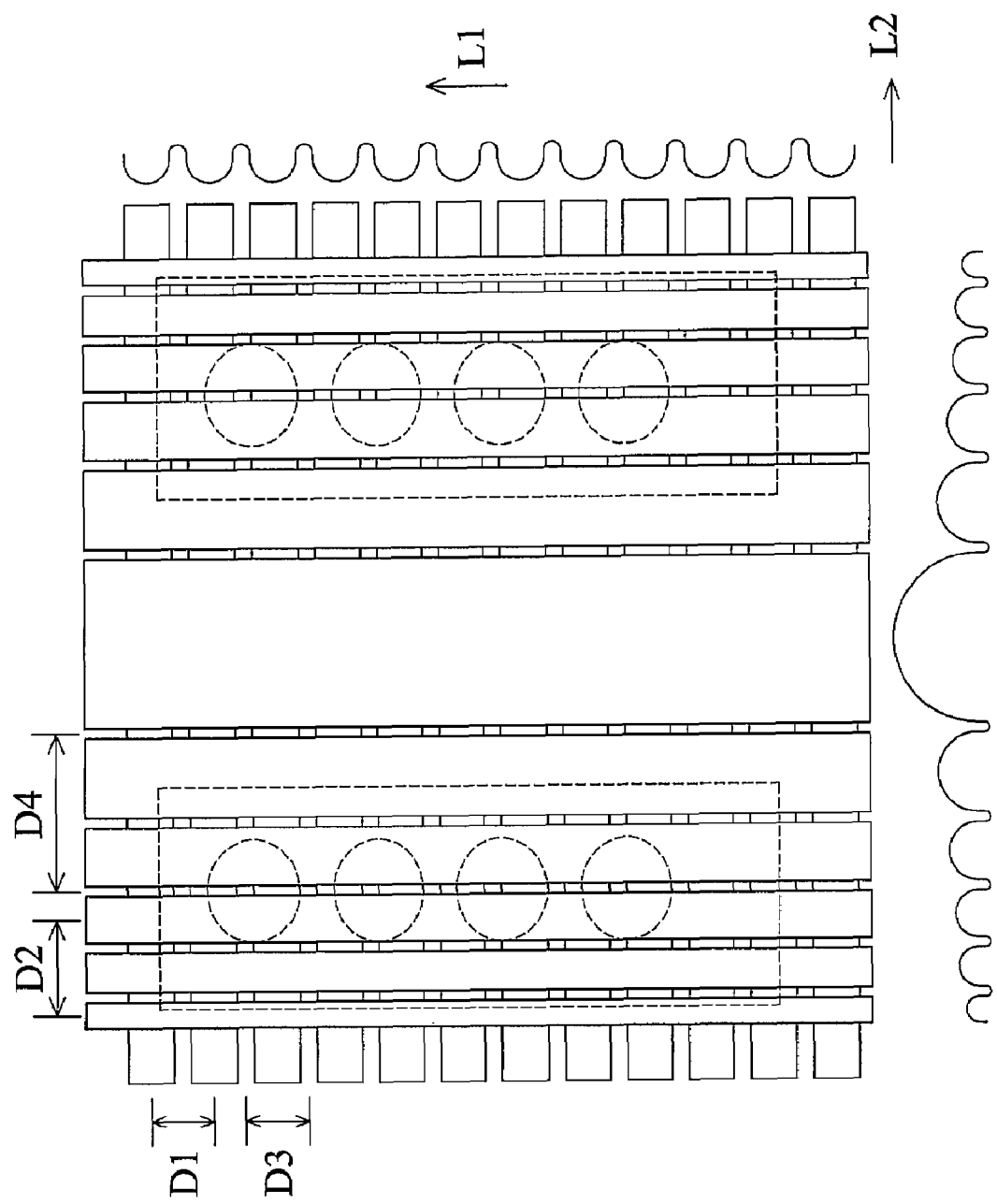
FIG. 7 is an intensity diagram of another embodiment of the optical diffusion structure of the invention.

FIG. 7 is an intensity diagram for another embodiment of the optical diffusion structure of the invention. Distances D1 between any two adjacent convex portions 660 along the first direction L1 are the same. Distances D3 between any two adjacent concave portions 680 along the first direction L1 are the same. Distances D2 between any two adjacent convex portions 660 along the second direction L2 are different. Distances D4 between any two adjacent concave portions 680 along the second direction L2 are different. D2 and D4 decrease gradually from a center to lateral sides of the optical diffusion structure 640.

Figure 8:
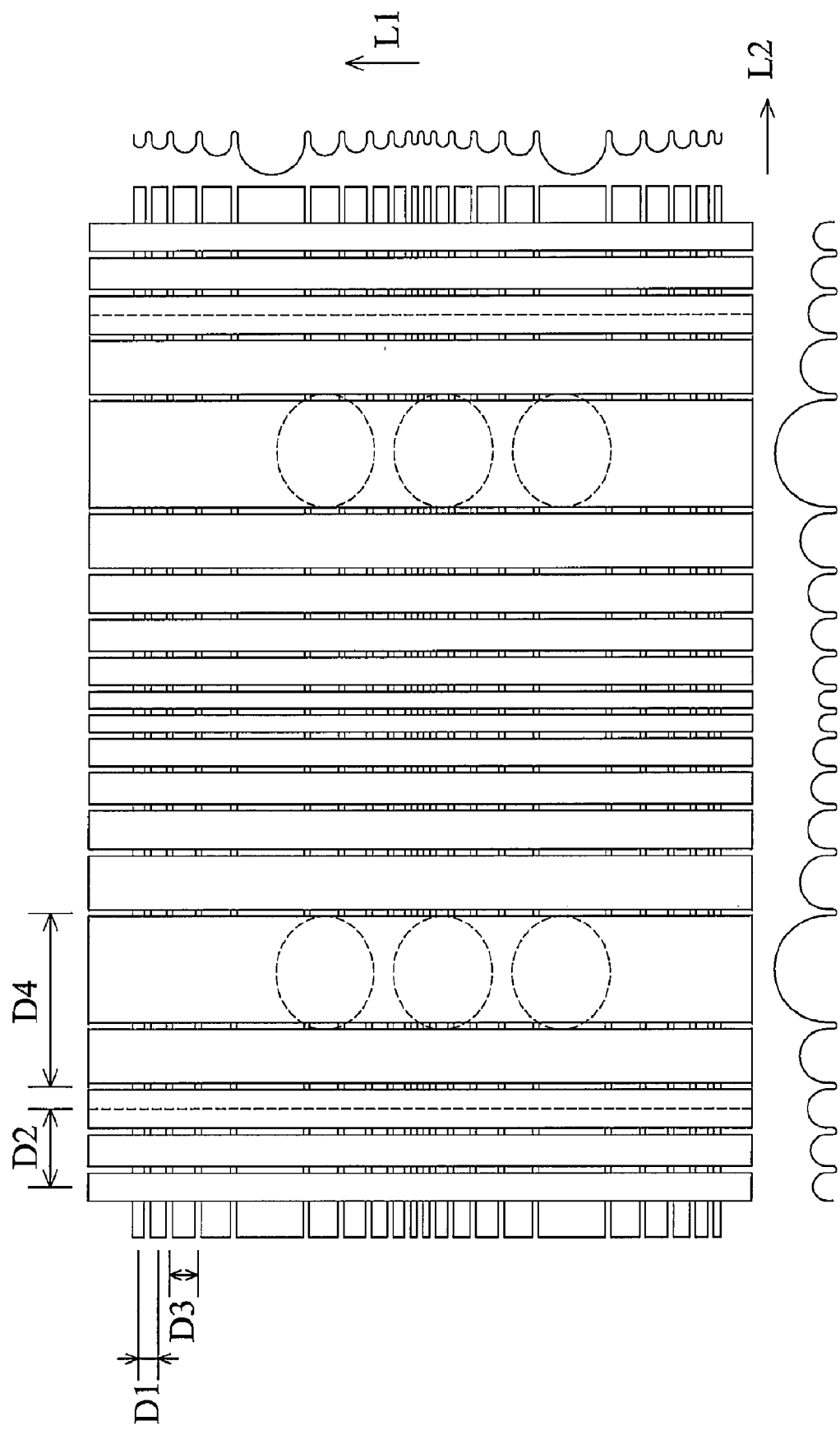
FIG. 8 is an intensity diagram of another embodiment of the optical diffusion structure of the invention.

FIG. 8 is an intensity diagram for another embodiment of the optical diffusion structure of the invention. Distances D1 between any two adjacent convex portions 660 along the first direction L1 are different. Distances D3 between any two adjacent concave portions 680 along the first direction L1 are different. D1 and D3 increase gradually from a center to lateral sides of the optical diffusion structure 640. Distances D2 between any two adjacent convex portions 660 along the second direction L2 are different. Distances D4 between any two adjacent concave portions 680 along the second direction L2 are different. D2 and D4 increase gradually from a center to lateral sides of the optical diffusion structure 640.

The embodiments above are examples for description, but the invention is not limited thereto. For example, distances D1 between two adjacent convex portions 660 are different along the first direction L1, but Distances D3 between any two adjacent concave portions 680 along the first direction L1 are the same.

In addition, although the first direction L1 and the second direction L2 in the described embodiments are perpendicular, the first direction L1 and the second direction L2 can also be other than perpendicular.

Figure 9:
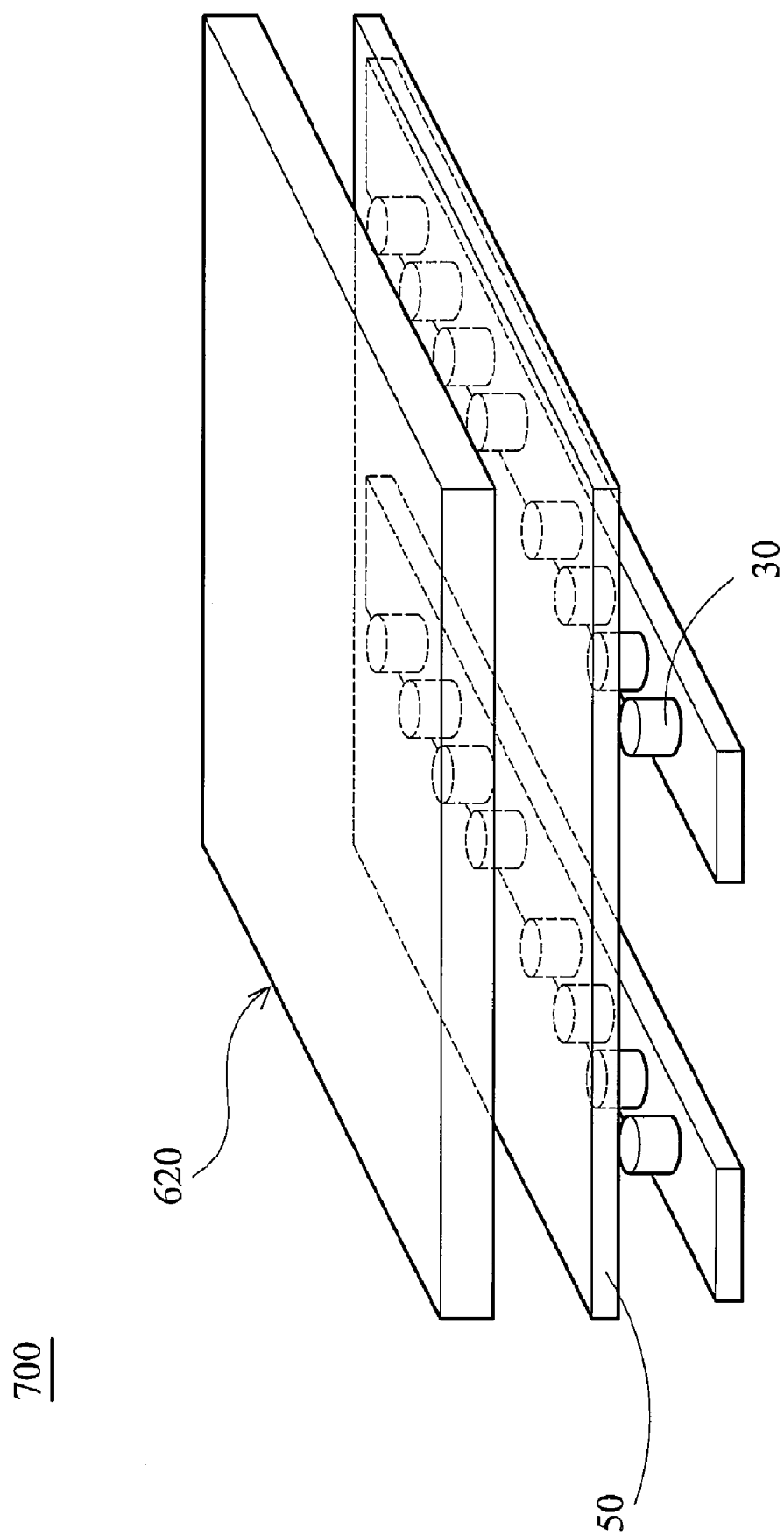
FIG. 9 depicts the optical diffusion structure of the invention used with a diffusion sheet.
Figure 10:
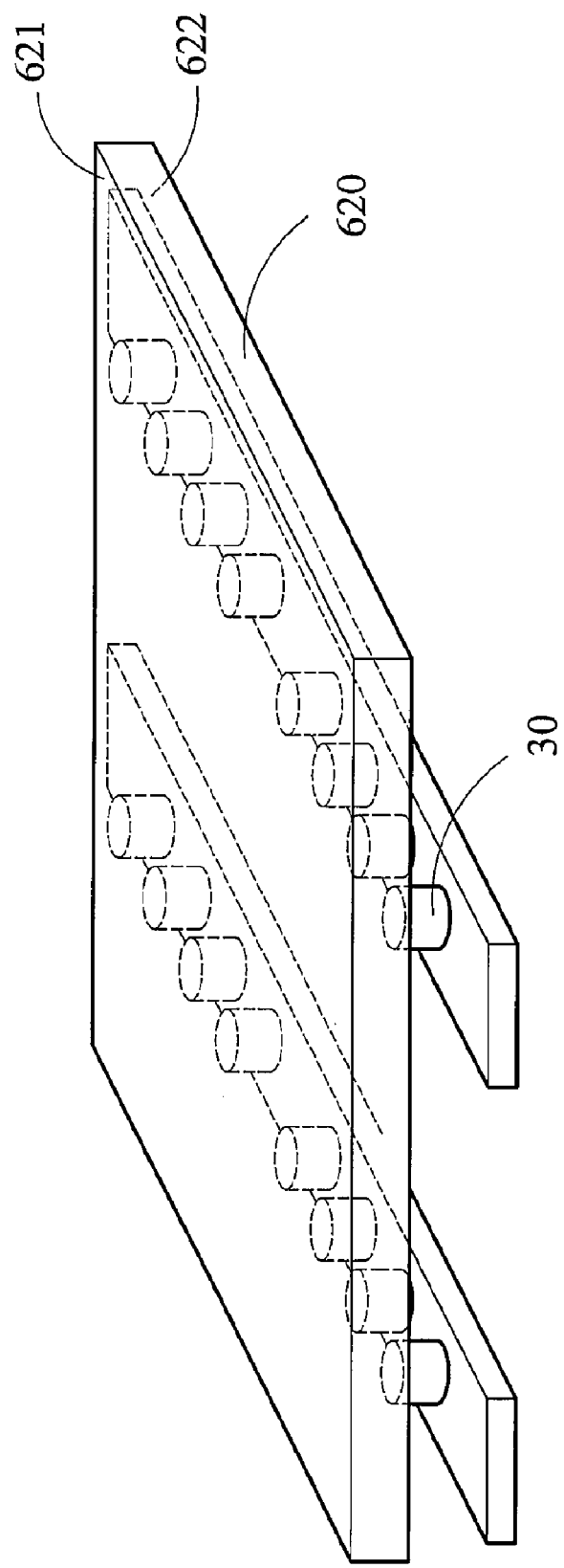
FIG. 10 depicts the optical diffusion structure of the invention used with a grained structure.
Figure 11:
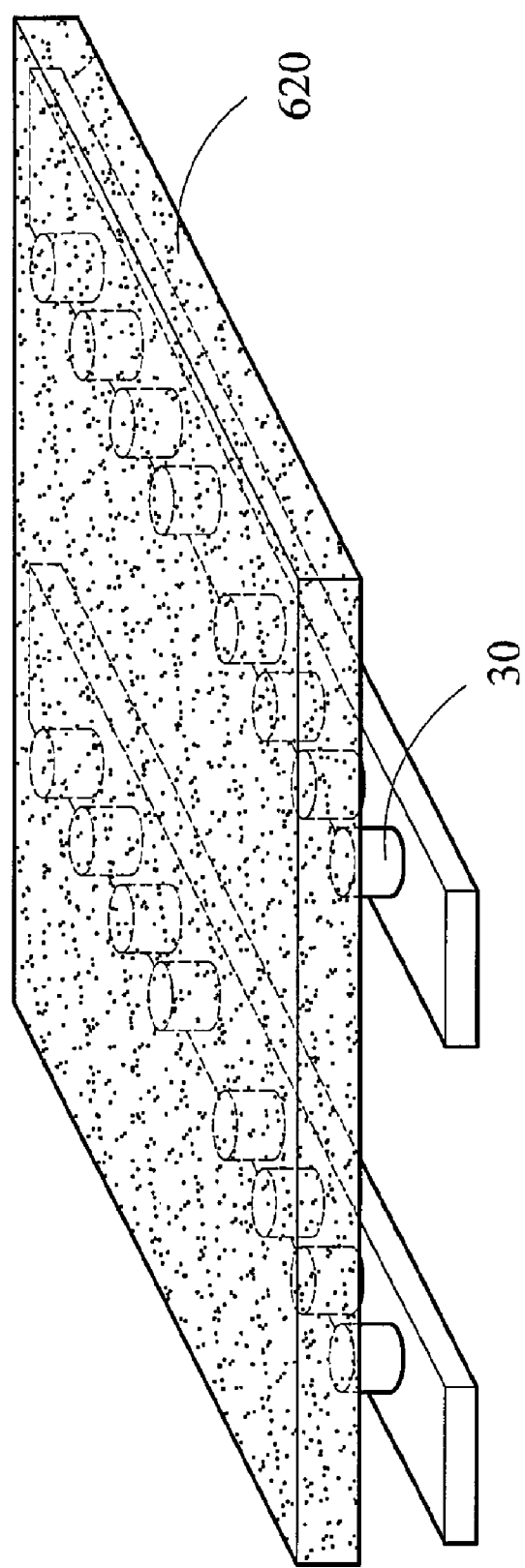
FIG. 11 depicts the optical diffusion structure of the invention manufactured by a polymer with optical diffusion effect.

The diffusion plate 620 can be combined with a typical diffusion plate 50 to constitute an optical diffusion module 700 shown in FIG. 9. Number 30 is a LED array. In FIG. 10, an optical diffusion module 800 comprises a grained structure or a blurred structure formed on the bottom (second surface) 622 of the diffusion plate 620 (the optical diffusion structure 600 is formed on the first surface 621) to enhance light diffusion. In FIG. 11, an optical diffusion module 900 comprises the diffusion plate 620 of a polymer with light diffusion characteristics.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical diffusion module, comprising:
   an optical diffusion structure comprising a plurality of convex portions having a first curvature, a plurality of concave portions having a second curvature, and a plurality of saddle portions, wherein each convex portion is adjacent to a plurality of concave portions and a plurality of saddle portions and each concave portion is adjacent to a plurality of convex portions and a plurality of saddle portions which are lower than the convex portions and higher than the concave portions, the first curvature, the second curvature, and a curvature of each junction of the convex and concave portions is different from 0, and surfaces of the convex and concave portions are continuous and smooth; and
   a diffusion plate having a first surface, wherein the optical diffusion structure is formed on the first surface, and the convex portions are arranged in a two dimensional array along a first direction and a second direction, and the concave portions are arranged in a two dimensional array along a third direction and a fourth direction, and each convex portion is sandwiched by saddle portions in both the first direction and the second direction, and each concave portion is sandwiched by saddle portions in both the first direction and the second direction, and distances from one convex portion to other convex portions, which are adjacent to the one convex portion, are different along the second direction.

2. The optical diffusion module as claimed in claim 1, wherein distances from one convex portion to other convex portions, which are adjacent to the one convex portion, are the same along the first direction.

3. The optical diffusion module as claimed in claim 2, wherein distances from one convex portion to other convex portions, which are adjacent to the one convex portion, are the same along the second direction.

4. The optical diffusion module as claimed in claim 3, wherein distances from one concave portion to other concave portions, which are adjacent to the one concave portion, are the same along the first direction.

5. The optical diffusion module as claimed in claim 4, wherein distances from one concave portion to other concave portions, which are adjacent to the one concave portion, are the same along the second direction.

6. The optical diffusion module as claimed in claim 1, wherein the distance from one convex portion to another convex portion, which is adjacent to the one convex portion, decreases from a center to lateral sides of the optical diffusion structure along the second direction.

7. The optical diffusion module as claimed in claim 1, wherein the distance from one convex portion to another convex portion, which is adjacent to the one convex portion, increases from a center to lateral sides of the optical diffusion structure along the second direction.

8. The optical diffusion module as claimed in claim 1, wherein distances from one concave portion to other concave portions, which are adjacent to the one concave portion, are the same along the first direction.

9. The optical diffusion module as claimed in claim 8, wherein distances from one concave portion to other concave portions, which are adjacent to the one concave portion, are different along the second direction.

10. The optical diffusion module as claimed in claim 9, wherein the distance from one concave portion to another concave portion, which is adjacent to the one concave portion, decreases from a center to lateral sides of the optical diffusion structure along the second direction.

11. The optical diffusion module as claimed in claim 9, wherein the distance from one concave portion to another concave portion, which is adjacent to the one concave portion, increases from a center to lateral sides of the optical diffusion structure along the second direction.

12. The optical diffusion module as claimed in claim 1, wherein distances from one convex portion to other convex portions, which are adjacent to the one convex portion, are different along the first direction.

13. The optical diffusion module as claimed in claim 12, wherein distances from one convex portion to other convex portions, which are adjacent to the one convex portion, are different along the second direction.

14. The optical diffusion module as claimed in claim 13, wherein the distance from one convex portion to another convex portion, which is adjacent to the one convex portion, decreases from a center to lateral sides of the optical diffusion structure along the first direction.

15. The optical diffusion module as claimed in claim 14, wherein the distance from one convex portion to another convex portion, which is adjacent to the one convex portion, decreases from a center to lateral sides of the optical diffusion structure along the second direction.

16. The optical diffusion module as claimed in claim 14, wherein the distance from one convex portion to another convex portion, which is adjacent to the one convex portion, increases from a center to lateral sides of the optical diffusion structure along the second direction.

17. The optical diffusion module as claimed in claim 13, wherein the distance from one convex portion to another convex portion, which is adjacent to the one convex portion, increases from a center to lateral sides of the optical diffusion structure along the first direction.

18. The optical diffusion module as claimed in claim 17, wherein the distance from one convex portion to another convex portion, which is adjacent to the one convex portion, increases from a center to lateral sides of the optical diffusion structure along the second direction.

19. The optical diffusion module as claimed in claim 12, wherein distances from one concave portion to other concave portions, which are adjacent to the one concave portion, are different along the first direction.

20. The optical diffusion module as claimed in claim 19, wherein distances from one concave portion to other concave portions, which are adjacent to the one concave portion, are different along the second direction.

21. The optical diffusion module as claimed in claim 1 further comprising a diffusion layer, wherein light from a light source passes through the diffusion layer and the diffusion plate sequentially.

22. The optical diffusion module as claimed in claim 1, wherein the diffusion plate further has a second surface on which a grained structure is formed, and light from a light source passes through the second surface and the first surface sequentially.

23. The optical diffusion module as claimed in claim 1, wherein the diffusion plate further has a second surface on which a blurred structure is formed, and light from a light source passes through the second surface and the first surface sequentially.

24. The optical diffusion module as claimed in claim 1, wherein the diffusion plate is made of polymer with optical diffusion effect.

25. An optical diffusion module, comprising:
   an optical diffusion structure comprising a plurality of convex portions, a plurality of concave portions and a plurality of saddle portions which are lower than the convex portions and higher than the concave portions, wherein each convex portion is adjacent to a plurality of concave portions and a plurality of saddle portions and each concave portion is adjacent to a plurality of convex portions and a plurality of saddle portions, and the convex portions, the concave portions and each junction of the convex and concave portions have a curvature different from 0 and surfaces of the convex and concave portions are continuous and smooth; and
   a diffusion sheet on which the diffusion structure is formed, wherein the convex and concave portions of the diffusion structure extend along a first direction and are arranged alternatingly along a second direction, and each convex portion is sandwiched by saddle portions in both the first direction and the second direction, and each concave portion is sandwiched by saddle portions in both the first direction and the second direction, and each convex portion is curved and has a first curved surface having a first width along the second direction, which is varied along the second direction, and each concave portion is curved and has a second curved surface having a second width along the second direction, which is varied along the second direction.

26. The optical diffusion module as claimed in claim 25, wherein the first width decreases from a center to lateral sides of the first diffusion structure.

27. The optical diffusion module as claimed in claim 26, wherein the second width decreases from a center to lateral sides of the first diffusion structure.

28. The optical diffusion module as claimed in claim 25, wherein the first width increases from a center to lateral sides of the first diffusion structure.

29. The optical diffusion module as claimed in claim 28, wherein the second width increases from a center to lateral sides of the first diffusion structure.

30. The optical diffusion module as claimed in claim 28 further comprising a diffusion layer, wherein the light from the light source passes through the diffusion layer and the diffusion structure sequentially.

* * * * *